UNITED STATES PATENT OFFICE.

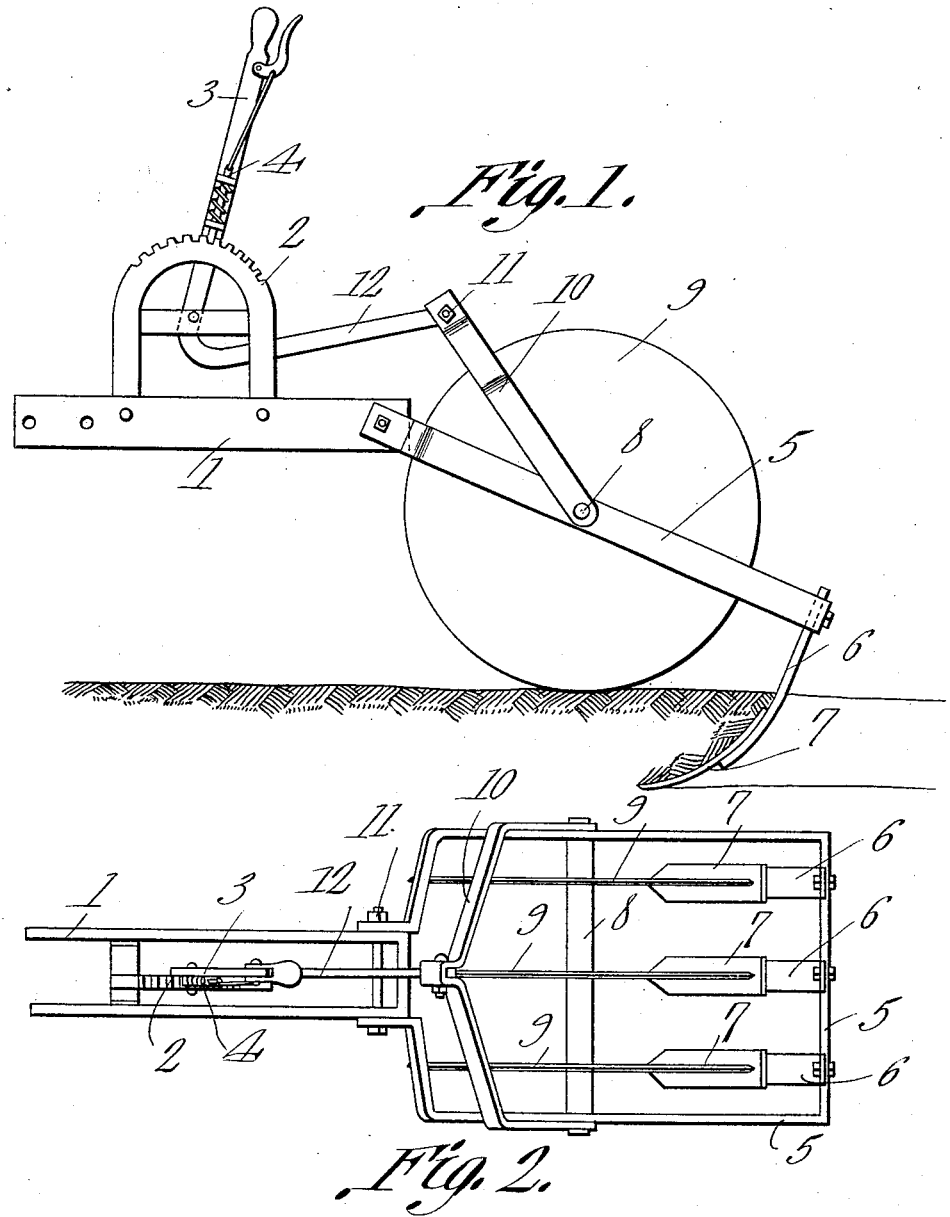

WILLIAM C. ALFORD, OF HAZELTON, KANSAS.

SUBSOILING ATTACHMENT FOR PLOWS.

1,052,118. Specification of Letters Patent. Patented Feb. 4, 1913.

Application filed May 17, 1912. Serial No. 698,048.

*To all whom it may concern:*

Be it known that I, WILLIAM C. ALFORD, a citizen of the United States, residing at Hazelton, in the county of Barber and State of Kansas, have invented a new and useful Subsoiling Attachment for Plows, of which the following is a specification.

This invention relates to subsoiling attachments for plows, its object being to provide a simple device of this character which can be readily applied to an ordinary plow and which will travel within the furrow and loosen the subsoil without throwing any of it from the furrow.

Another object is to provide an attachment of this character having supporting disks adapted to travel upon the bottom of the furrow and to cut a path therealong so as to maintain the diggers in proper position within the furrow.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings the preferred form of the invention has been shown.

In said drawings; Figure 1 is a side elevation of the attachment. Fig. 2 is a plan view thereof.

Referring to the figures by characters of reference 1 designates a yoke having a toothed segment 2 mounted thereon, there being an adjusting lever 3 connected to and adapted to swing relative to said segment and provided with a spring pressed dog 4 of the usual form adapted to engage the segment and thus lock the lever in any position to which it may be adjusted. The end portions of the yoke 1 are adapted to be placed at opposite sides of a plow stock or beam and to be bolted or otherwise secured thereto.

A frame 5 is pivotally connected to the rear portion of the yoke 1 and is provided, at its rear end, with a series of spring standards 6 each of which carries a small shovel 7. A shaft 8 extends transversely of the frame 5 and mounted thereon is a series of supporting disks 9. Each of these disks is preferably flat, as shown, and one of the disks is arranged directly in front of each of the standards 6, the number of disks being equal to the number of standards. A bail 10 is pivotally mounted on the end of shaft 8 and is connected, as at 11, to an arm 12 extending from the lower end of the lever 3.

In using the device herein described the yoke 1 is first secured back of the plow so that the disks 9, when lowered, will travel along the bottom of the furrow produced by the plow. By manipulating lever 3, these wheels 9 can be raised or lowered within the furrow. When the disks are in contact with the bottom of the furrow, the shovels 7 project into the subsoil. Thus it will be seen that, as the plow moves forward, the disks 9 will travel along the bottom of the furrow and the shovels 7 will loosen the subsoil. As the disks 9 are arranged in parallel planes, said planes being parallel with the path of movement of the plow, it will be apparent that they will guide the subsoiling shovels along the proper path and will, furthermore, prevent any of the soil from being thrown laterally out of the furrow.

By referring to Fig. 2 it will be seen that the disks 9 are provided with cutting edges and are located directly in front of the centers of the shovels 7. Thus, as the shovels dig into and elevate portions of the subsoil, said elevated portions are forced against the cutting edges of the disks and severed thereby. By providing a gang of disks and shovels adapted to travel within a furrow, it will be apparent that the subsoil will thus be pulverized.

What is claimed is:—

A subsoiling attachment for plows, including attaching means, a frame pivotally secured to said attaching means and adapted to swing upwardly and downwardly relative thereto, a gang of parallel cutting and supporting disks mounted for rotation within the frame, a gang of shovels secured to the rear portion of the frame and extending downwardly therefrom, the center of each shovel being in the same plane with one of the disks and each shovel extending downwardly and forwardly under the disk in
5 rear thereof, an adjusting lever having a rearwardly extending arm, and a connection between the arm and the frame.

In testimony that I claim the foregoing as my own, I have hereto affixed my signature in the presence of two witnesses.

WILLIAM C. ALFORD.

Witnesses:
  Geo. W. Fain,
  Daniel O. Eduards, Jr.

Copies of this patent may be obtained for five cents each, by addressing the "Commissioner of Patents, Washington, D. C."